United States Patent

[11] 3,536,035

| [72] | Inventor | Harley E. Watkins<br>P.O. Box 1193, Englewood, Colorado 80110 |
|---|---|---|
| [21] | Appl. No. | 539,227 |
| [22] | Filed | Nov. 26, 1965 |
| [45] | Patented | Oct. 27, 1970 |

[54] APPARATUS FOR FLAVORING OF SNACK FOODS AND THE LIKE
8 Claims, 16 Drawing Figs.

[52] U.S. Cl. ................................................ 118/24, 99/140, 118/19, 118/636
[51] Int. Cl. ........................................................ A23l 1/22, A23g 3/20
[50] Field of Search.......................................... 118/24, 25, 303, 308, 309, 312, 620, 621, 627, 629, 630, 634, 636, 19; 99/1, 80, 83, 86, 100, 140, 234, 238.4; 117/17

[56] References Cited

UNITED STATES PATENTS

| 2,560,047 | 7/1951 | York et al. ................ | 118/634 |
| 2,565,454 | 8/1951 | MacKenzie et al. ......... | 99/259 |
| 2,889,805 | 6/1959 | Freeder ..................... | 118/634X |
| 2,994,618 | 8/1961 | Landgraf .................... | 118/634 |
| Re20,660 | 2/1938 | Schacht ..................... | 117/17 |
| 2,173,032 | 9/1939 | Wintermute ................ | 118/629X |
| 2,245,301 | 6/1941 | Schacht..................... | 118/636X |
| 2,394,657 | 2/1946 | Beregh ...................... | 118/627 |
| 3,114,482 | 12/1963 | Dunaway................... | 118/308UX |

*Primary Examiner*—Raymond N. Jones
*Assistant Examiner*—James R. Hoffman
*Attorney*—Lyon and Lyon

ABSTRACT: Food products have condiment particles and the like applied thereto. The condiment particles are mixed in an airstream which passes, in turn, through an ionized region to charge the particles, then through a chamber containing the food product of electric charge opposite to that of the particles to deposit the particles on the food product. Such chamber is of special construction having a rotatable food product container which is rotated by the airstream. Such airstream after passage through the container is recirculated in turn through a region where the particles are introduced then through such ionized region and such chamber where again ionized particles are deposited. Such container may be inverted to drop the treated food product onto a discharge conveyor belt while a like container is positioned to receive the new untreated food product from a feed conveyer without a requirement that the airstream during this container movement be discontinued.

FIG. 1.

INVENTOR.
HARLEY E. WATKINS
BY
Lyon & Lyon
ATTORNEYS

Patented Oct. 27, 1970

INVENTOR.
HARLEY E. WATKINS
BY Lyon & Lyon
ATTORNEYS

INVENTOR.
HARLEY E. WATKINS
BY Lyon & Lyon
ATTORNEYS.

APPARATUS FOR FLAVORING OF SNACK FOODS AND THE LIKE

The present invention relates to improved means and techniques for flavoring and seasoning of snack foods such as potato chips, corn chips, potato products, grain cereals and the like.

In the processing of potato chips, for instance, the usual method of adding salt, cheese or the like thereto is to sprinkle the condiment onto the food product by hand or by shaking devices as it moves along a traveling belt. Cleaned but conventional cement mixers have also been used for this purpose. Such treatment results in a considerable wastage of the condiment, as well as being inaccurate in the distribution of the condiment on the various pieces of the food product. Similar problems exist in the application of other condiments to other food products, such as salt, pepper, sugar, cinnamon or the like, including the application of cinnamon to apple slices, for instance.

Among the objects of this invention are to provide a novel method of and apparatus for the treatment of a food product to apply a condiment thereto; to provide such a method which is simple and effective; to provide novel apparatus which will carry out such a method in an efficient and effective manner; to provide such a method and apparatus which will distribute the condiment evenly over the surface of the food product; to provide such a method and apparatus which can be used effectively with numerous and different types of condiments; to provide such a method and apparatus which can be used effectively for the treatment of a large variety of food products; and to provide such apparatus which can be readily built and easily operated.

One aspect of the present invention involves the use of an electrostatic field to which various flavorings such as cheese, onion, garlic, barbecue flavoring, are subjected so as to impart a particular charge to the same whereby the same may be attracted to the previously mentioned food products and to adhere thereto in such a manner that such flavoring materials remain in contact with the food products and do not become dislodged therefrom in subsequent handling of packages containing such flavored food products.

A particular advantage of this invention is that the food products are coated with the flavoring particles uniformly and on both sides in a simple and expeditious manner.

It is therefore a general object of the present invention to provide an improved arrangement of this character wherein food flavoring powder is initially subjected to an electrostatic field to charge particles comprising the powder with the charged particles then being directed to the food product for flavoring by such particles.

Another specific object of the present invention is to provide improved means and techniques for flavoring of snack type food items with powdered flavorings.

It will be understood that the present invention may be used for flavoring various food products, for example, sugar may be applied uniformly to cookies, cheese to crackers, frosting to cookies and bakery goods, salt to pretzels, flavoring to popcorn, and in the cereal industry, sugar to various types of cereal products, and in the meat industry, flavoring may be applied to meats and meat products and of course various flavorings may be applied to different types of nuts, vegetable products and fruits and other food products. In some cases better results are obtained when the flavoring material is heated.

Other objects and advantages of the present invention will be apparent from the following description, reference being made to the accompanying drawings wherein.

Figure 1:
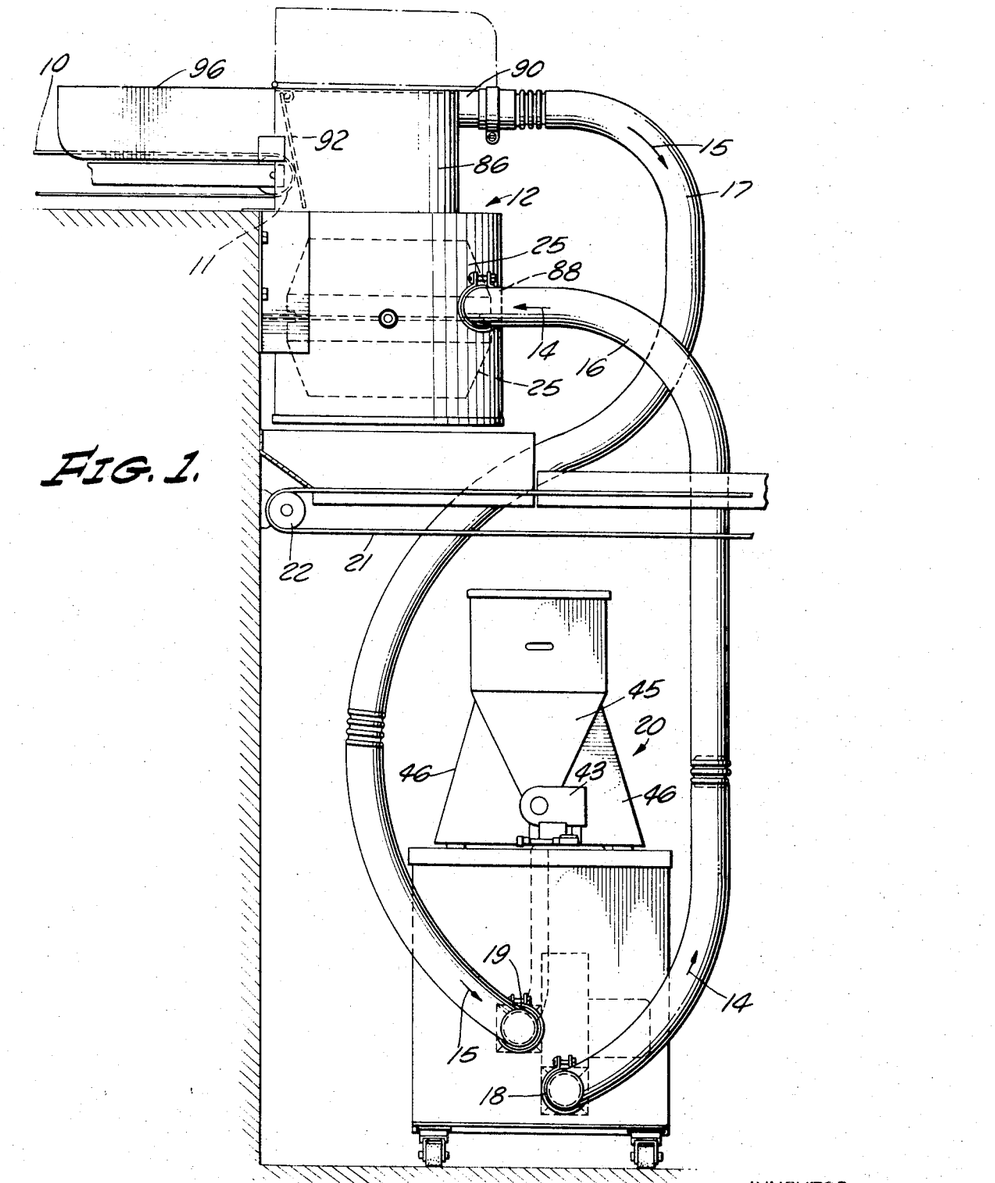
FIG. 1 illustrates novel apparatus connected in a new system embodying features of the present invention, the system being a closed air circulation system using an electric ion chamber that charges the flavoring particles as they are carried by the air to the product.

Referring to FIG. 1, food products which are to be flavored of the character mentioned above are supplied to the system via an endless conventional conveyor belt 10 passing over a roller 11. Such food products thus drop into a flavoring chamber 12 through which air containing ionized particles is circulated as indicated by the arrows 14 and 15 associated with the flexible conduits 16 and 17 having their lower ends in communication with the outlet 18 and inlet 19 of the apparatus 20 in which an air blower is mounted together with means for feeding flavoring materials and means for ionizing such flavoring material so that an airstream is produced containing ionized flavoring material.

After treatment in the flavoring chamber 12 the food products are allowed to gravitate onto a second endless belt 21 passing over a pulley 22. For this purpose the flavoring chamber 12 incorporates a specially constructed rotatable basket or hopper 25 through which the aforementioned airstream is circulated as indicated by the arrows 26, in FIG. 6 the airstream causing the basket 25 to rotate due to this particular construction which is described later.

Figure 8:
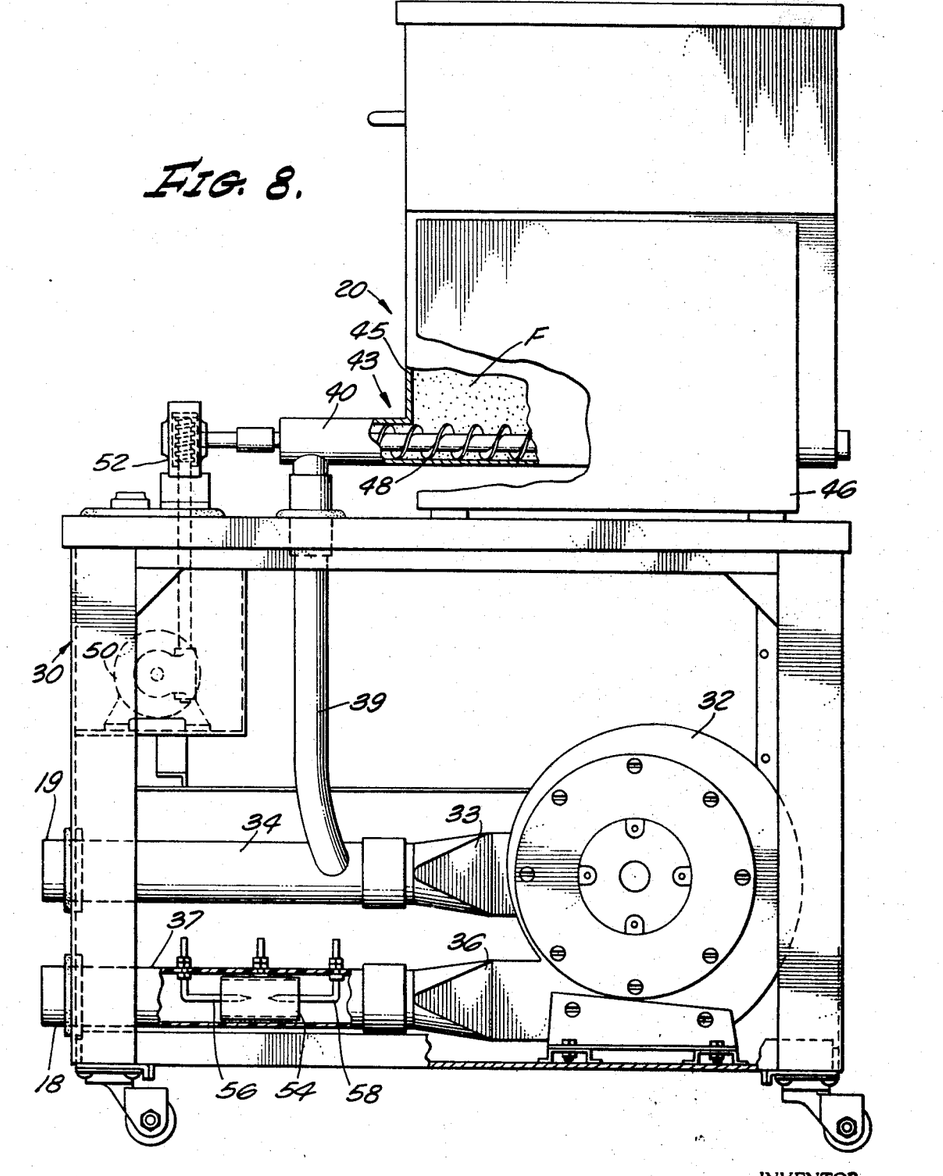
FIG. 8 illustrates other constructional features of the apparatus shown in in FIG. 1.

The airstream containing the ionized flavoring particles is produced by the apparatus 20 which is described in detail in connection with FIG. 8 wherein the apparatus is illustrated as being mounted on a wheeled frame structure 30 in which is mounted a conventional motor driven air fan 32 having its inlet 33 connected to the inlet 19 via conduit 34 and its outlet 36 connected to the outlet 18 via conduit 37. Between the inlets 19 and 33 there is a conduit 39 extending upwardly from conduit 34 to the outlet 40 of a flavoring material feed mechanism 43 whereby flavoring material in metered amounts may be fed via the vertical conduit 39 to the conduit 34 interconnecting the inlets 19 and 33.

The flavoring feeding device 43 is of conventional construction and includes a bin 45 having downwardly extending converging walls supported by a complementary shaped support structure 46. A conventional motor driven feed screw 48 is at the bottom of the bin 45, such screw 48 being driven by a motor 50 via a conventional adjustable speed control unit 52 which serves to adjust the speed at which the screw 48 is rotated and thereby the rate at which the flavoring material F is fed to the downwardly extending suction tube 39.

The conduit 37 is of insulating material and interconnects the outlets 36 and 18, this insulating tube 37 being constructed to mount an electrode structure involving an inner metal tube 54 and two facing pointed electrodes 56 and 58 coaxial with the tube 54.

A high intensity electrostatic field is formed by suitable voltages applied to the electrodes 54, 56 and 58 in sufficient amount to produce a corona discharge within tube 54, such corona being swept out of the area between the electrodes when and as the flavoring laden air is circulated through the conduit by the air fan 32. The voltages may be direct current or alternating current voltages and such voltages applied may be applied in different manners. For example, the tube 54 may be at ground or reference potential and the electrodes 56 and 58 may each be connected to an ungrounded terminal of a grounded high voltage source.

At the outlet 18 there is a stream of air containing ionized flavoring particles and such stream is introduced into the flavoring chamber 12 via the conduit 16 as explained previously.

The flavoring chamber 12 (FIG. 1) of generally cylindrical construction includes a rotatable base or hopper 25 which is rotatable to allow food products, previously flavored, to drop onto the conveyor belt 21.

Figures 5, 6:
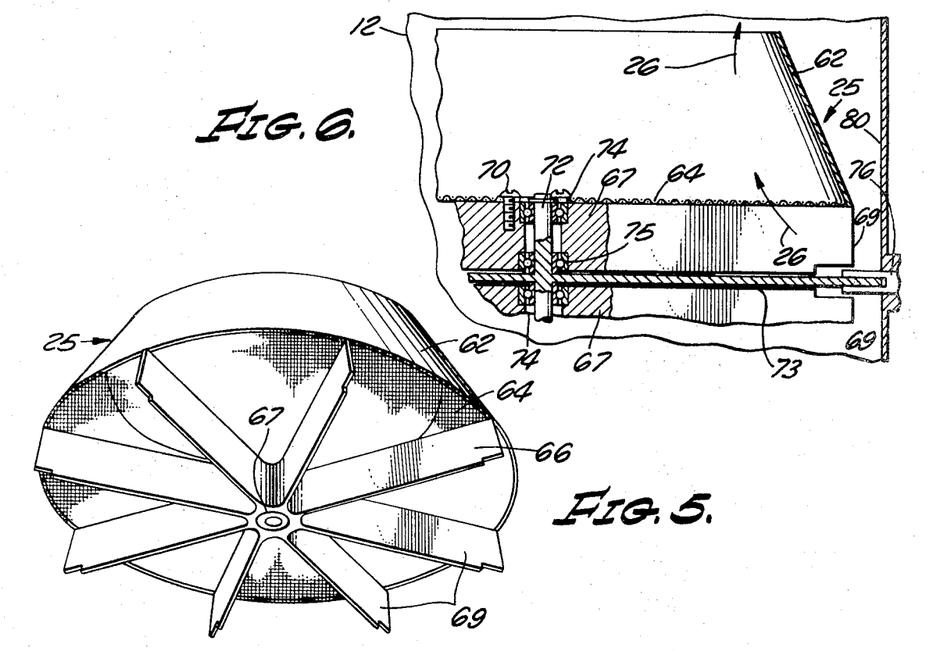
FIG. 5 is a perspective view of essentially one-half of the turntable element shown in FIG. 4 in full and also in dotted lines.
FIG. 6 is a sectional view taken substantially as indicated by the line 6–6 in FIG. 7.

This rotatable basket or hopper 25 involves two like constructions, one of which is seen in FIG. 5. Each includes a truncated conical portion 62 which is closed at its end of larger diameter by a screen 64 having its peripheral edge suitably secured to such conical portion 62.

A hubbed element 66 having a hub portion 67 from which flat plates 69 extend radially is secured to the central portion of the screen using machine screws 70 as seen in FIG. 6.

Figure 7:
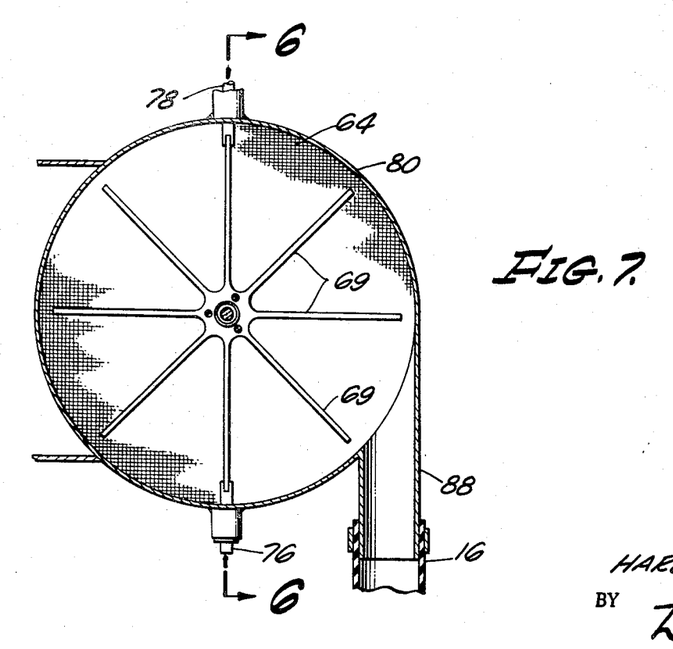
FIG. 7 is a view taken as indicated by line 7–7 in FIG. 4.

Another identical structure like that shown in FIG. 5 is mounted back-to-back with the same using a member 72 having two shaft portions shown in FIG. 6, such portions being within the inner races of bearings 74 and 75 having their outer race members recessed within the hubbed portions 67 of the two identical elements 25. Extending radially outwardly from these shaft portions is a disc portion 73 that cooperates with axially aligned shaft portions 76, 78 (FIG. 6 and 7) journaled in and extending through the cylindrical chamber wall 80.

A motor 82 (FIG. 2) is mounted externally of the cylindrical chamber wall 80 for rotating the assembled hoppers 25 through 180° each time the motor 82 is energized.

Figures 2, 3, 4:
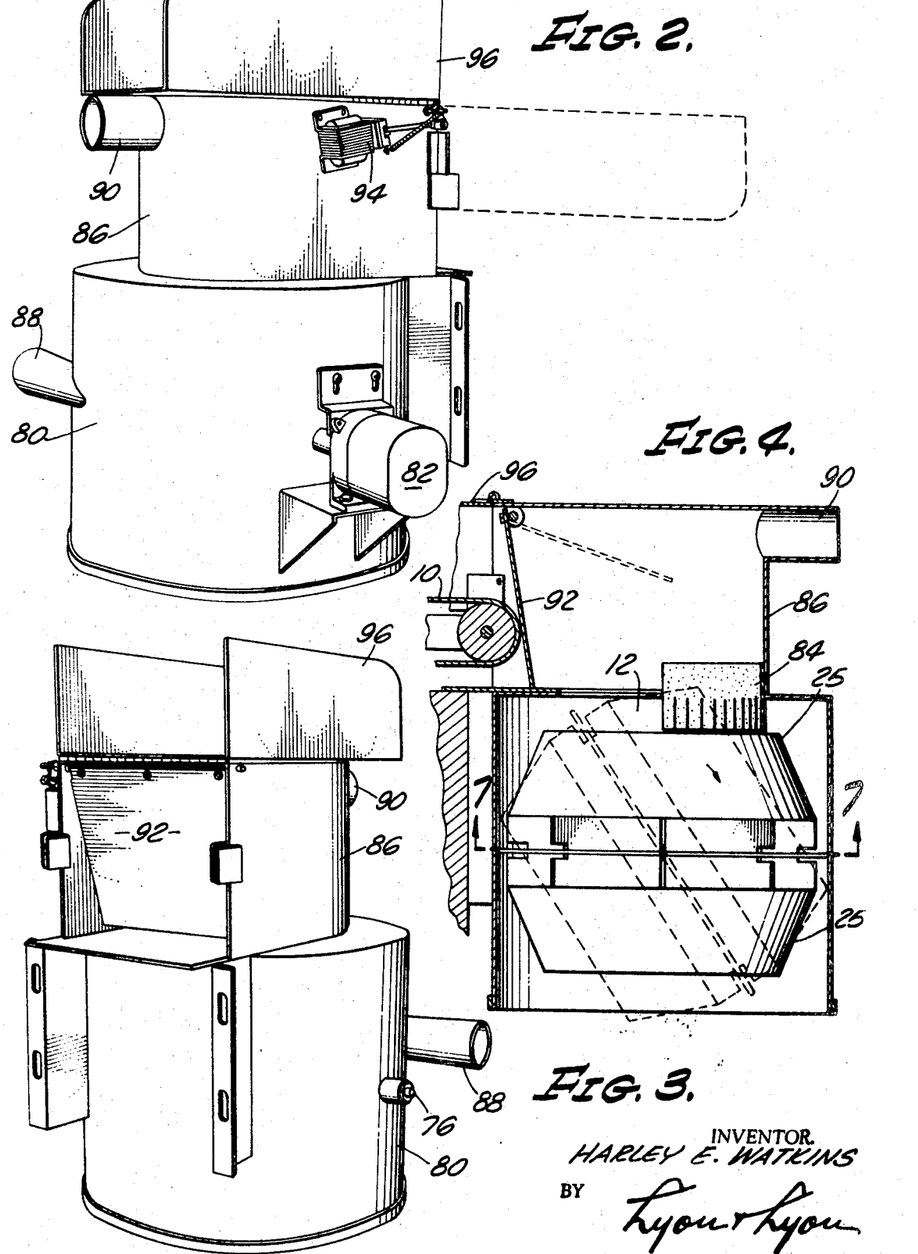
FIGS. 2 and 3 are perspective views showing some of the apparatus seen in the upper portion of FIG. 1.
FIG. 4 is a generally sectional view illustrating more details of the apparatus seen in the upper part FIG. 1 and in different positions.

During rotation of the assembly 25, 25 as indicated by the dotted lines in FIG. 4, the slitted rubber gasket element 84 which is generally circular and which extends downwardly from casing part 86 into the flavoring chamber 12 is deflected to allow passage of the assembly, such gasket member 84 normally in the stationary condition of the assembly serving as a guide or throat for assuring gravitation of all of the food products from belt 10 into the upper hopper or basket 25. During the flavoring operation the assembly 25, 25 is in its full line position shown in FIG. 4 but is rotated about its axis by the airstream. The airflow is through the inlet 88, (FIG. 7) upwardly through the screen 64, (FIGS. 6 and 7) then upwardly through the conical member 62 and outwardly through the outlet 90 (FIGS. 2 and 4). During such airflow the assembly 25, 25 is rotated as a result of the air entering the tangentially located inlet conduit 88 impinging on the vanes or plates 69. Such rotation assures a uniform flavoring of the food products then in the upper basket 25, this rotation being assured by providing ball bearings between the basket assembly 25, 25 and the shaft portions of element 72 as shown in FIG. 6.

During the time this flavoring in the chamber 12 takes place the chamber 12 is maintained against substantial air leakage so that indeed there is a circulation through the conduits 14 and 15 as intended. For this purpose during such air circulation the door or flap 92 hinged on casing part 86 is in its closed position as illustrated in FIGS. 1 and 4, from where it may be subsequently retracted to its open position shown in dotted lines in FIG. 4 by subsequent actuation of the solenoid 94 connected by suitable linkages to the flap 92 for that purpose. Also, if desired, the disc member 73 may have an elastic gasket member bonded thereto along its periphery so as to contact the inner surface of wall 80 to provide a seal.

In operation, the solenoid 94 is energized to thereby cause the flap 92 to move from its normally closed position to its normally open position illustrated in dotted lines in FIG. 4. In such condition the belt 10 is moving and food products may gravitate therefrom into the upper basket 25 in the flavoring chamber 12. After a predetermined period of time the supply belt 10 may be stopped and the flap 92 allowed to close to thereby condition the chamber 12 for air circulation with the chamber 12 then being part of a closed air path. The ionized flavoring particles carried by the airstream then flow upwardly through the upper basket 25 with the air stream producing rotation of the basket assembly 25, 25 to assure uniform flavoring or treatment of the food products in the upper basket 25. After this flavoring process takes place for a predetermined time a one-half revolution of the shaft is initiated and completed by energizing the drive motor 82 in which case the upper basket 25 is rotated into a lower basket position to allow the treated food products therein to gravitate onto the discharge belt 21 and at the same time the previously lower basket 25 is now in an upper position to receive food products delivered thereto via the feed belt 10. The upper end of the casing part 86 may be provided with a pivoted generally U-shaped baffle 96 which is moved from its upper or retracted position illustrated in FIGS. 2 and 3 to its lower position illustrated in FIGS. 1 and 4 wherein such baffle 96 assures retention of the food products on the feed belt until the same gravitates into the upper basket 25.

It will be appreciated that one skilled in the art with the teachings herein may provide conventional means to achieve a synchronized or timed operation of the motor 82, solenoid 94, motor 50 and the means for driving the feed belt 10 so as to assure a continuous operation with substantially no loss of flavoring material or unflavored food product in that time interval when the double basket arrangement 25, 25 is rotated by motor 82 to discharge previously flavored food products onto the discharge belt 21.

In the modified form of the invention shown in FIGS. 9—12 there is provided a hopper 100 of generally V-shaped cross section and having a pair of end plates 101, 102 which are sufficiently prolonged to provide legs 101A, 102A for supporting the assembly shown in these FIGS.

Figures 9, 12:
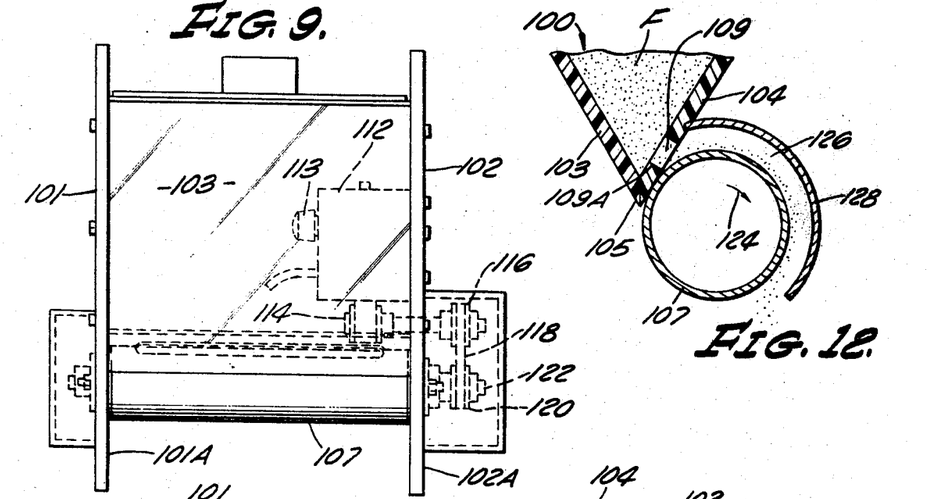
FIGS. 9—12 illustrate another form of the present invention, FIGS. 9 and 10 being front and side views of apparatus embodying the invention, and FIGS. 11 and 12 being sectional views taken substantially as indicated by the lines 11–11 in FIG. 10 and 12–12 in FIG. 11.
Figure 10:
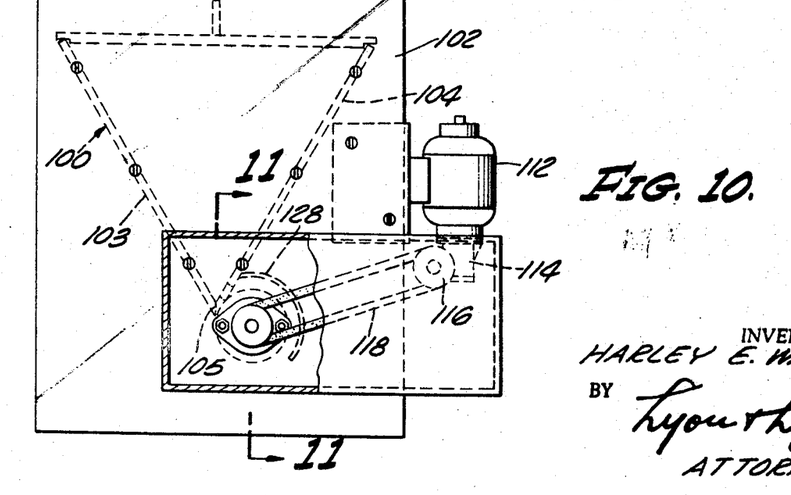

The downwardly extending and converging walls 103, 104 of the hopper 100 meet at an apex portion 105 which is contacted by a metallic rotating cylinder 107 maintained at a high electrical potential, either a high AC voltage or a high DC voltage being applied to the roller 107 for that purpose.

Figure 11:
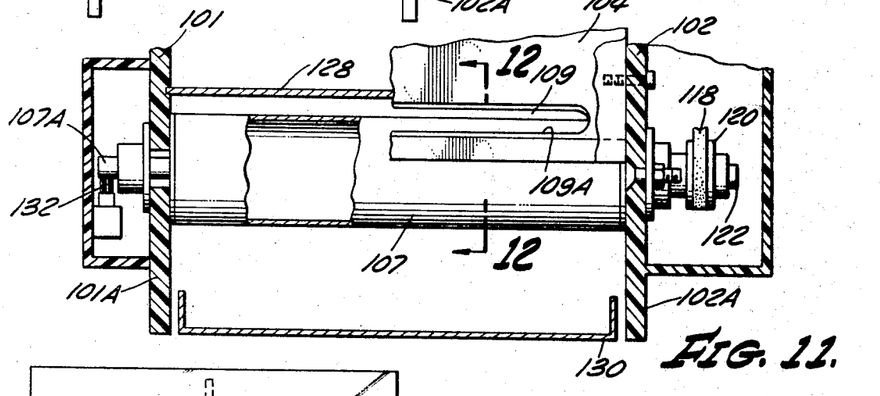
Figure 13:
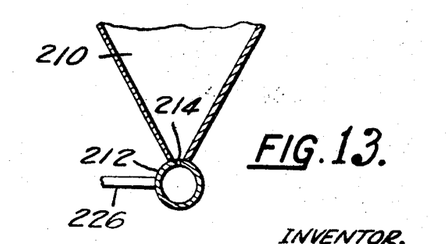
FIGS. 13—16 illustrate another form of the present invention, FIG. 13 being a vertical section, on an enlarged scale, taken along line 13–13 of FIG. 15, and showing particularly a slot in a blower intake pipe, through which a condiment is fed from a funnel, and FIG. 14 being a vertical section, taken along line 14–14 of FIG. 15, FIG. 15 being a side elevation of apparatus constructed in accordance with this invention, and particularly adapted to carry out the method thereof, with a heavy pipe or sleeve broken away to show an electrode mounted in the interior thereof and the electrical parts of the apparatus shown diagrammatically, and FIG. 16 being a top plan view of the container for the food product, broken away.

As seen in FIG. 12, the hopper side wall 104 is formed with an apertured portion 109 which, as shown in FIG. 11, extends parallel with the axis of the cylindrical roller 107 and is somewhat less than the full length of the roller 107.

Suitable means are provided for rotating the electrified roller 107 and such means is illustrated as including a motor 112 mounted together with a control 113 therefor on the side plate 102. The motor 112 drives a suitable speed reduction unit 114 that is an output shaft mounting a pulley 116, a belt 118 passing over the pulley 116 and a pulley 120 on a shaft extension 122 of roller 107 drives the roller 107. Such roller 107 is insulatedly mounted for rotation between the side walls 101, 102 using suitable bearings for that purpose. In effecting an electrical isolation of this roller 107 the hopper structure 100 including the end walls 101, 102 and side walls 103, 104 are preferably made of a nonconductive plastic material, the same also being transparent to allow vision of the amount of flavoring material F being dispensed during rotation of the drum 107. As seen in FIG. 12, the highest point on the drum 107 is above the lower edge 109A of the apertured portion 109 so that the roller 107 in its motionless condition is capable of preventing flow of the flavoring material F from the hopper 100. However, when and as the drum or roller 107 is rotated in the clockwise direction in FIG. 12 as indicated by the arrow 124, flavoring material F is dispensed in an amount depending of course upon the speed of rotation of the drum 107, the flavoring material F in such case flowing through the apertured portion 109 onto the roller 107 which carries it within an annular space 126 defined by a portion of the outer surface of roller 107 and an arcuate metal element 128 having a center of curvature coextensive with the rotational axis of the drum 107. This element 128 is suitably secured between the end plates 101 and 102 and may enter a notched portion of the bin wall 104 as indicated in FIG. 12. This metal element 128 may be maintained at an electrical ground potential and the roller 107 may be maintained at an elevated potential or, in some cases, it may be desired to ground the roller 107 and apply the high voltage either AC or DC to the element 128. In either case, there is an electrostatic field between the drum 107 and the arcuate element 128 and such electrostatic field may be of sufficient intensity to produce a corona discharge, i.e., to ionize the air between the elements 107 and 128, all for the purposes of charging the fine particles of flavoring material F in the region between the drum 107 and element 128. Such charged particles carried by the drum 107 ultimately gravitate downwardly onto the foodstuffs or comestibles in a shallow pan or tray 130; such pan or tray 130 may be stationary or may be, for example, in the form of an endless belt that travels in timed relationship with movement of the drum 107.

In those cases where it is desired to apply the high voltage to the drum 107, the drum 107 may be provided with a shaft extension 107A contacted by a brush 132, the high voltage then being applied to the brush 132. On the other hand, as alluded to above, the high voltage may be applied to the stationary element 128 particularly since it is supported on elements of insulating material that serve to isolate electrically the element 128 from the roller 107.

It will be seen that in each of these arrangements the containers for the food products are of metal and are considered as being at ground potential and may be connected electrically to a good ground connection so that in such case the particles of flavoring material, condiment or the like are charged to a relatively high voltage with respect to ground or reference potential and such particles are discharged into a container, at ground potential, for the food product, the food product thus being considered as being of an electrical polarity opposite to that of the charged particles so as to achieve an electrostatic attraction between the particles and food products. In FIG. 1 the conduit 16 and 17 may be of insulating material or lined with insulating material to preserve the charge on the particles.

The voltages used may be in the order of 30,000 volts produced as a rectified alternating current. Further it will be seen that the airstream may be regulated to control the amount of particles of condiment flavoring material or the like carried by the airstream. Such means may be incorporated in the system of FIG. 1 in the form of an adjustable damper in the air intake line to the blower. Such damper may be disposed in the section 33 (FIG. 8) between the outlet of the flavoring material conduit 39 and the inlet to the blower 32.

One aspect of the present invention thus involves the steps of feeding particles of the condiment of flavoring material into an airstream, charging the particles to a relatively high voltage while being carried by the airstream and discharging the particles into a chamber containing the food product, while connecting the food product to a terminal of opposite polarity to the particles. The food product is preferably agitated in the chamber, while the walls forming the chamber may be utilized as the terminal of opposite polarity, conveniently at ground potential.

The apparatus shown in FIGS. 13—16 is also particularly adapted to carry out aspects of this invention and includes a funnel 210 or similar container, adapted to contain a supply of the condiment or flavoring material. A top 211 may be inserted in the upper end of the funnel, to keep the supply of condiment in the funnel, particularly in the case of a condiment, such as pepper. The lower end of funnel 210 is attached to an air intake pipe 212 for a blower 213, surrounding a slot or hole 214 in pipe 212, as in FIG. 13. A damper 215 controlled by a handle 216 is installed in pipe 212 between the funnel and blower, to control the amount of condiment picked up by the air and discharged by the blower through blower outlet 217. Blower 212 is conveniently driven by a conventional motor 218, and neither the blower nor motor need be of a particularly large size, since a relatively large amount of condiment can be handled by a relatively small volume of air. An insulated conduit, such as a heavy plastic pipe 220, is installed on the blower outlet 217, to insulate the preceding portion of the apparatus from an electrode 221, which extends into and then longitudinally of the insulating conduit 220. The electrode 221 causes the condiment particles carried by the airstream and being blown through the insulated conduit to be charged electrostatically, such as to 30,000 volts or more, so that, as the charged condiment particles are blown into a container C, providing a chamber, they will be deposited by electrostatic action on the food product, such as potato chips, apple slices or the like, within the container C. The container C is provided with a hole 222, as in FIG. 16, into which the end of the plastic pipe 220 is inserted, and a small vent 223, disposed away from the end of the pipe 220, as in FIG. 14, to relieve the air pressure in the container. The food product in the container is, of course, opposite in polarity to the charged particles of the condiment and therefore will attract the condiment particles. A cover 224 for the container C is provided with a flange 225, as shown, for sealing the end of the container, although any other suitable type of seal between the cover and the container may be utilized. Vent 223 is connected to air intake pipe 212 by a conduit or tube 226, for recirculation of any condiment escaping through the vent and also to prevent condiment from being blown out into the air. Tube 226 may be formed of a suitable plastic, to provide flexibility.

Figure 15:
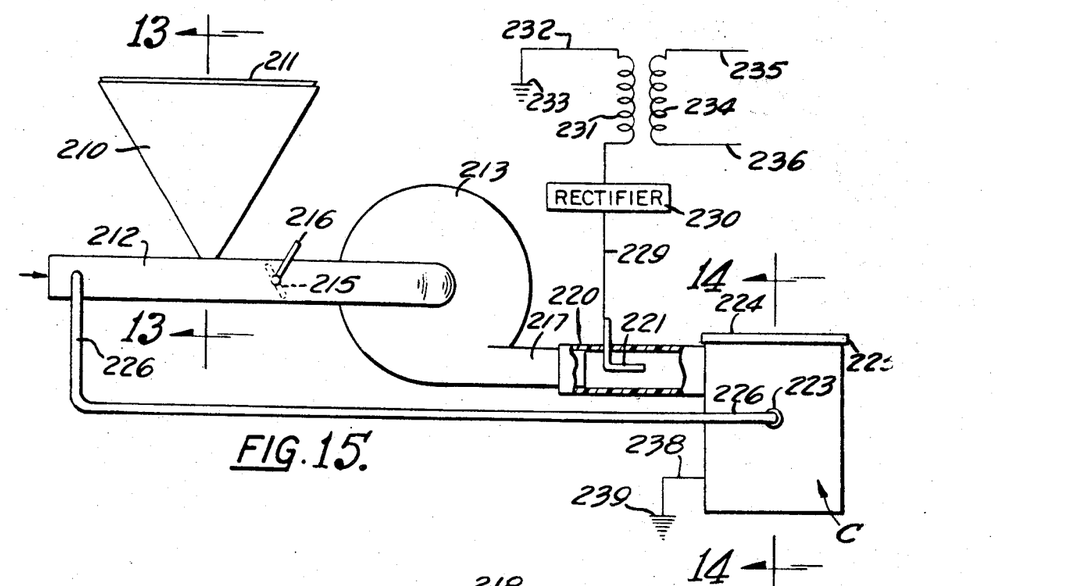
Figure 16:
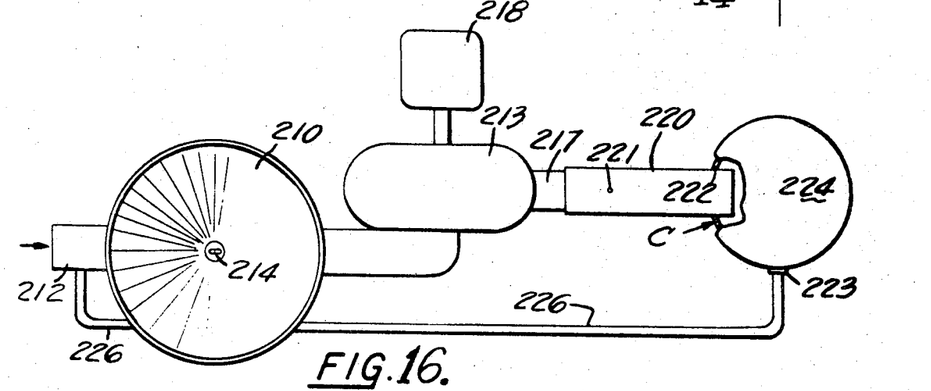

Electrode 221 is connected by a wire 229 with a conventional rectifier 230, either half wave or full wave, although preferably the latter, such as an 1B3 cold cathode rectifier. The transformer may also be connected in a voltage doubler circuit. Rectifier 230, in turn, is connected with the secondary coil 231 of a transformer, the opposite end of the secondary coil being connected by a wire 232 with a ground 233. The primary coil 234 of the transformer is connected by leads 235 and 236 with a suitable source of alternating current, in a conventional manner. The container C is also connected by a wire 238 with a ground 239, so that the operator may handle the container without injury. Wire 238 may, if desired, be connected to wire 232.

For treatment, the cover 224 of the container C is removed and the food product, such as potato chips or the like, is placed therein, so that the container is full, or nearly full, and the cover is then replaced. The container may be filled while in position on the plastic pipe, or may be filled and then placed on the plastic pipe. The switch (not shown) controlling the flow of current to the transformer is then turned on and the blower started, with proper adjustment of damper 215, so that the amount of condiment flowing to the container will be most effectively handled. During the passage of electrically charged condiment particles into the container, the food product is preferably moved around, as by reciprocating the container between the position shown and a position directly opposite thereto, although the container may be rotated, as by a suitable mechanism. In the latter instance, it will usually be preferable to connect the ground wire to the container through a stationary brush and ring mounted on the container, or vice versa, to prevent the ground wire being wrapped around the plastic pipe, during rotation of the container.

When the desired amount of condiment has been deposited on the food product in the container, the blower may be shutoff, or the damper 215 closed, to shut off the intake to the blower. Then, the cover 224 may be removed from the container C and the treated food product discharged from the container, as by merely turning the container upside down, so that the treated food product will drop into a suitable receptacle placed beneath the container for the purpose. Of course, the container may be removed from the plastic pipe and the treated food product discharged into a receptacle at another position. The period during which the charged condiment particles are blown into the container containing the food product will depend somewhat upon the amount of food product in the container and the type of condiment with which the food product is being treated. Thus, when cheese particles or the like are being deposited on potato chips, for instance, the flow of particles may be adjusted, so as to be somewhat less than when a condiment, such as salt, is being deposited on potato chips. In any event, the time of treatment is relatively short, varying from perhaps several seconds to one minute or more.

From the foregoing, it will be evident that the method and apparatus of this invention fulfill to a marked degree the requirements and objects hereinbefore set forth. Due to the fact that the condiment particles are picked up by an airstream and are blown into a container in which the food product has has been placed, the condiment particles tend to fill the container. Since the condiment particles are highly charged, they will naturally become affixed to the food product of opposite polarity, so that a distribution of condiment particles to all of the food product in the container is enhanced. Furthermore, the agitation or movement of the food product, in the container, ensures that each piece of the food product will be contacted by charged condiment particles. Furthermore, all sides of each piece of the food product will attract the charged condiment particles, so that a more efficient and particularly more effective distribution of the condiment particles is achieved.

Figure 14:
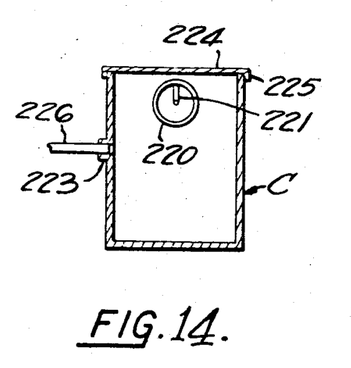

It will be noted that the airstream circulating in the container C tends to dislodge particles of condiment deposited on the walls of the chamber formed by the container and to pick up such dislodged condiment particles. To facilitate such dislodgement, the walls of the chamber are preferably smooth. Such particles of dislodged condiment, whose charge may be lost, can be carried through the vent 223 for recirculation through tube 226 to the air intake and recharging when again passing the electrode.

It will be understood that the apparatus illustrated in the drawings is exemplary only and that various modifications may be made therein, including an enlargement of the relative size of the container for the food product, so that a considerably larger volume of the food product may be treated at one time. It will also be understood that various phases of the operation may be made automatic, including the charge of the food product into the container and the discharge of the treated food product therefrom. It will be further understood that the movement of the container to agitate the food product during treatment may be accomplished in many other ways. It will also be understood that the shape of the chamber, in which the food product is placed may be varied, as well as the means for agitating the food product while in the chamber. It will further be understood that the method may be carried out as a continuous, rather than a batch, process. Thus, it will be understood that other embodiments exist and that various changes and variations may be made, all without departing from the spirit and scope of this invention.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:

1. Apparatus for treating a food product to add condiment particles and the like thereto, the combination including means developing a region of ionized air and means passing said particles through said region, conduit means defining a closed air circulating path, particle hopper means in communication with said conduit means for introducing said particles in said path, air circulating means in said path, electrode means in said path defining a region for ionizing air flowing through said path, said conduit means including a comestible treating chamber, and means for introducing a comestible to be coated in said chamber, said comestible chamber including a receptacle for said comestible, said receptacle being in the form of a perforated basket through which said air is circulated, said receptacle being rotatably supported in said chamber for rotation by the airstream in said conduit means.

2. Apparatus for treating a food product to add condiment particles and the like thereto, the combination including means developing a region of ionized air and means passing said particles through said region, conduit means defining a closed air circulating path, particle hopper means in communication with said conduit means for introducing said particles in said path, air circulating means in said path, electrode means in said path defining a region for ionizing air flowing through said path, said conduit means including a comestible treating chamber, and means for introducing a comestible to be coated in said chamber, said comestible chamber including a pair of baskets mounted in back to back relation, each of said baskets being perforated for the flow of air therethrough and being rotatable in said chamber from an upright position for receiving a comestible to an inverted position for discharging the comestible.

3. A system as set forth in claim 2 in which said pair of baskets are mounted in said chamber for rotation by said airstream.

4. A system as set forth in claim 3 in which said pair of baskets are mounted as a unit and each has a series of radially extending vanes, said chamber being in the form of a cylindrical drum having a tangentially located air inlet through which air flows and impinges on said vanes to rotate said unit.

5. A system as set forth in claim 2 including conveyor means for feeding a comestible to an upright basket, and conveyer means for receiving a comestible in the inverted condition of the basket.

6. A system as set forth in claim 5 including movable flap means defining a part of said conduit means, said flap means being between the first-mentioned conveyer means and an upright basket, and means for moving said flap means.

7. Apparatus for treating a food product to add condiment particles and the like thereto, comprising:
a blower having an intake pipe and a discharge pipe;
an adjustable damper in said intake pipe;
a receptacle containing said condiment particles and connected with an opening in said intake pipe, said damper being disposed between said condiment opening and said blower;
a conduit formed of electrically insulating material and connected with said discharge pipe;
an electrode extending into said conduit and then longitudinally thereof in a direction away from said blower;
a source of high voltage alternating current and means for rectifying said current connected to said electrode;
a metallic container having a removable top and forming a terminal of opposite polarity to said electrode, said container having an opening in a side wall thereof overlapping said insulating conduit and a vent, smaller than said opening, at a position spaced from said opening, said container being movable about said insulating conduit; and
a return conduit from said vent to said air intake pipe.

8. Apparatus for treating a food product to add condiment particles and the like thereto, the combination including means developing a region of ionized air and means passing said material through said region, a material hopper having a horizontally extending opening near its lower end, a drum rotatably supported adjacent said opening in contact with a portion of said hopper and onto which said material may gravitate, a curved electrode spaced from and extending around a portion of said drum and defining an annular space with said drum through which said material is carried by said drum when said drum is rotated.